No. 889,987. PATENTED JUNE 9, 1908.
H. W. TEN BROCKE.
COMBINED FENDER AND BRAKE.
APPLICATION FILED SEPT. 3, 1907.

2 SHEETS—SHEET 1.

No. 889,987. PATENTED JUNE 9, 1908.
H. W. TEN BROCKE.
COMBINED FENDER AND BRAKE.
APPLICATION FILED SEPT. 3, 1907.

2 SHEETS—SHEET 2.

Witnesses
A. Stimastel.
M. A. Schmidt.

Inventor
Herman W. Ten Brocke
By Milo B. Stevens & Co.
Attorneys.

UNITED STATES PATENT OFFICE.

HERMAN WILLIAM TEN BROCKE, OF MILWAUKEE, WISCONSIN.

COMBINED FENDER AND BRAKE.

No. 889,987.  Specification of Letters Patent.  Patented June 9, 1908.

Application filed September 3, 1907. Serial No. 391,252.

*To all whom it may concern:*

Be it known that I, HERMAN WILLIAM TEN BROCKE, a citizen of the United States, residing at No. 1914 Vliet street, Milwaukee, in the county of Milwaukee and State of Wisconsin, have invented certain new and useful Improvements in Combined Fenders and Brakes, of which the following is a specification.

This invention relates to a combined fender and brake for cars, and has for its object a brake and fender combination which is extremely simple in construction, strong, and reliable in its operation, and also comparatively inexpensive to manufacture.

The invention comprises a brake which is applied when the fender is lowered from its normal position to one in close proximity to the track rails. The construction of the brake is such that when it is applied it raises the wheels of the forward truck from the rails, thereby making it impossible to flatten the wheels by the car sliding.

A further object is to provide a fender which can be quickly lowered to operative position and which will effectually prevent any object from passing underneath the cars.

The brake and fender mechanism is so constructed that it can be applied to any ordinary car, no special car construction being necessary.

Figure 1:
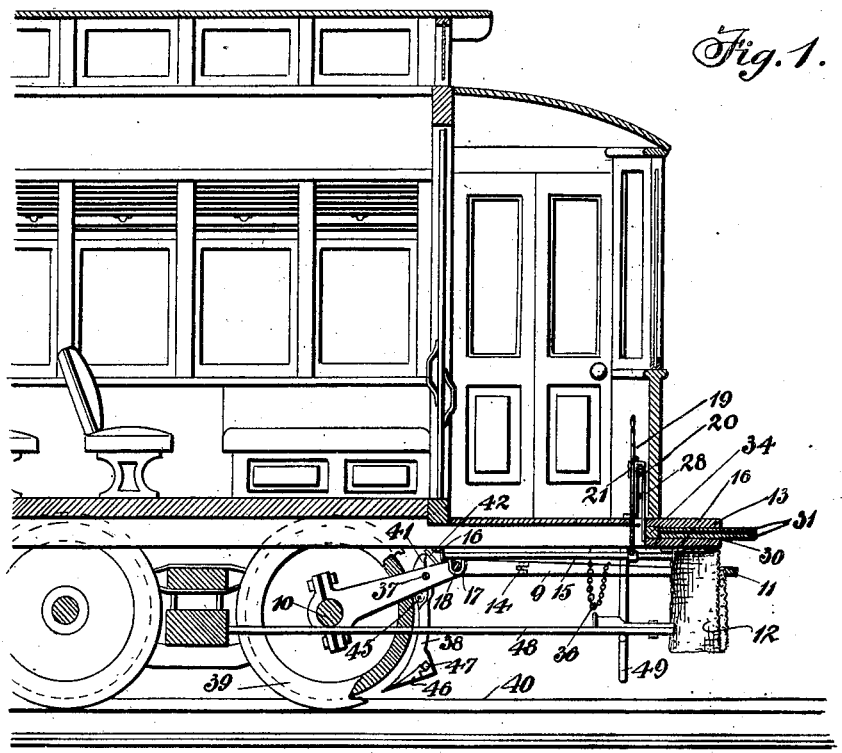
Figure 2:
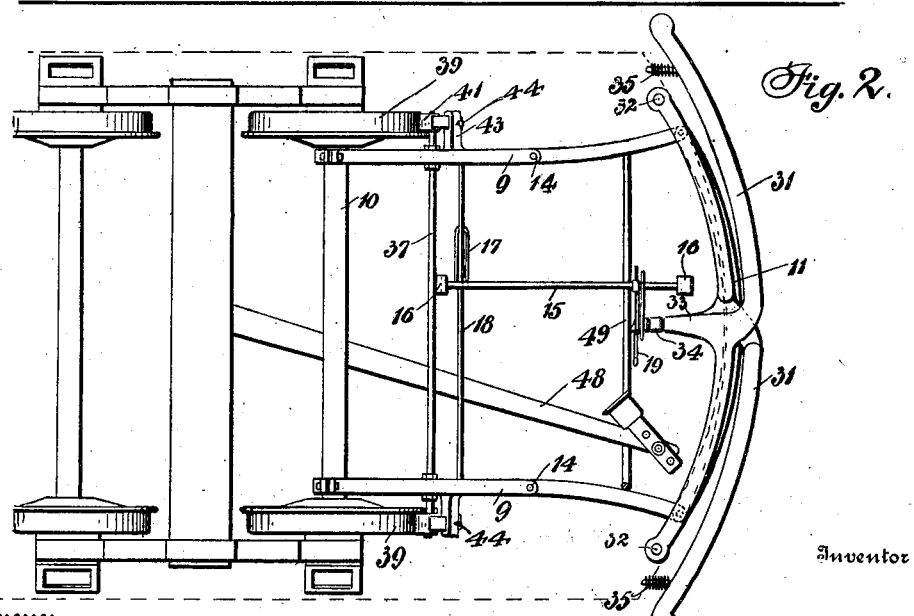
Figure 3:
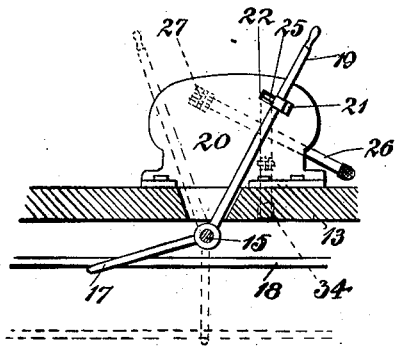
Figure 4:
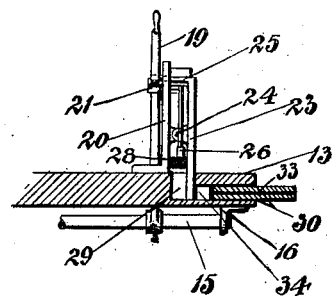
Figure 5:
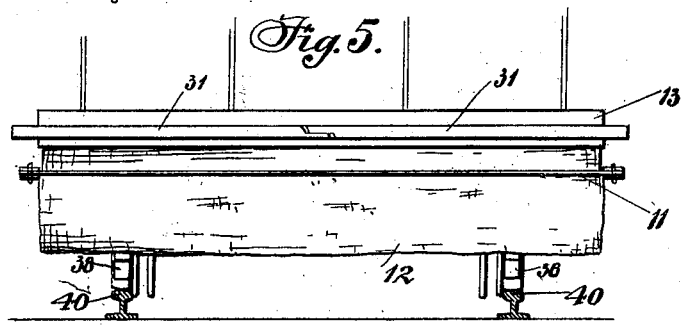
Figure 6:
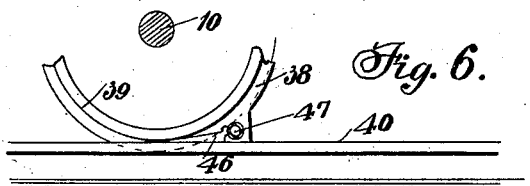
Figure 7:
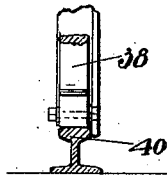
Figure 8:
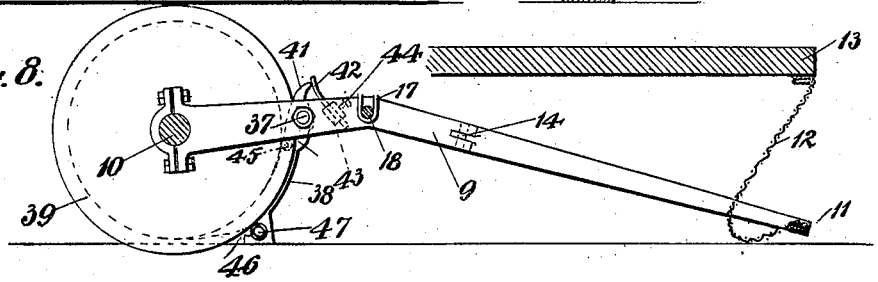

In the accompanying drawings, Figure 1 is an elevation of the front end of a car, partly in section, showing the application of the invention. Fig. 2 is a plan view, with the car body removed. Figs. 3 and 4 are details. Fig. 5 is a front elevation. Figs. 6 and 7 are details showing the brake shoe construction. Fig. 8 is an elevation showing the fender down and the brake applied.

Referring specifically to the drawings, 9 denotes a pair of beams which are hung loosely at one end on the front axle 10 of the forward car-truck so that they may freely swing up and down. At the other end the beams are connected by a cross-bar 11 to which is fastened one end of a flexible fender 12 which is fastened at the opposite end on the bottom of the front car-platform 13. The fender can be made of any suitable fabric of sufficient strength for the purpose, such as canvas, leather etc. The beams 9 are articulated as indicated at 14 and their connection with the cross-bar 11 is such that the truck is free to swing when going around curves.

At 15 is indicated a rock-shaft which is mounted in brackets 16 on the bottom of the car-platform. The rock-shaft carries a loop 17 through which passes a rod 18 extending between and connected to the beams 9. The rock-shaft has an operating lever 19 which passes through an opening in the car-platform near the front end thereof so as to be within easy reach of the motorman.

The beams 9 are raised and lowered to throw the fender 12 into and out of action, by swinging the loop 17 up or down, which is done by rocking the shaft 15 by means of the hand-lever 19. This operation is best illustrated in Figs. 2 and 3. When the loop 17 is in elevated position as shown by full lines in Fig. 3 the beams 9 through the connecting rod 18 are in elevated position and the fender is out of action. Upon rocking the shaft 15 by means of the hand-lever 19 so as to swing the loop 17 downwardly as shown by dotted lines in Fig. 3, the beams 9 are permitted to drop by gravity and the fender is opened out and thrown into operative position as shown in Fig. 8.

On top of the car-platform close to the hand-lever 19 is mounted a standard 20 having a stop 21 engaged by said hand-lever when in position to hold the beams 9 elevated. Adjacent the stop, the standard has a hole 22 through which passes a latch for holding the fender up. The latch is a lever 23 pivoted to the standard at 24 and having a lateral bend 25 which passes through the hole 22 and extends in front of the hand-lever. With the latch in this position the hand-lever is held against the stop 21 which locks the rock-shaft and holds the fender in elevated position. The latch is operated by a foot-lever 26 located between the standard 20 and the lever 23, and pivoted at 27 to the standard. Upon pushing the foot-lever forwardly against the lever 23, the part 25 is withdrawn from the hand-lever 19 through the hole 22, which releases the hand-lever and permits the shaft 15 to rock and drop the fender 12 in the manner heretofore described. A spring 28 between the latch lever 23 and the standard 20 normally holds the part 25 in engagement with the hand-lever 18. The outer end of the part 25 is beveled as shown in Fig. 2 in order that the hand-lever 19 may be swung back to its normal position without again pushing the foot-lever 26 forwardly. The latch is also operated automatically if an object strikes the front of the car. The following means are employed for this purpose:

In the car-platform 13 is a recess 29 into which the lower end of the latch-lever 23 extends. In the front edge of the car-platform is made another recess 30 which communicates with the recess 29. On the front end of the car-platform are buffers comprising levers 31 which are pivoted at 32 to the platform and extend along the entire front thereof. At the middle, the levers are crossed and formed with rearwardly presented arms 33 which enter the recess 30, and in said recess, between the ends of the arms and the lower end of the lever 23 is mounted a slide block 34. Between the free ends of the levers 31 and the front edge of the platform are springs 35 which are so tensioned that they readily yield to any blow against the levers.

In operation, if a person or other object is struck by either one of the levers 31, they yield, whereby the arm 33 is caused to slide rearwardly in the recess 30 and to push the block 34 against the end of the lever 23 which extends into the recess 29. This swings the lever 23 and withdraws the part 25 from the hand-lever 19 thereby releasing the latter and permitting the shaft 15 to rock and to drop the fender as heretofore described. The drop of the fender is limited by chains 36 connected to the bottom of the car-platform and to the beams 9.

The fender mechanism herein described, by reason of its simplicity of construction is not liable to get out of order and is therefore efficient and reliable in operation.

The brake-mechanism comprises the following means: 37 is a rod connected to and extending between the beams 9. To this rod on the outer side of the beams 9 are pivotally mounted brake-shoes 38 which are positioned and shaped so as to engage the tread of the front wheels 39 of the forward truck, as well as the tread of the rails 40. Above their pivots, the brake-shoes have rearward extensions 41 which abut against a flat spring 42 mounted in the slot of a projection 43 formed on the beams 9 and held in place by set screws 44. The function of the springs 42 is to normally force the brake-shoes away from the wheel. Below their pivots, the brake-shoes carry rollers 45 which are for a purpose to be hereinafter described. The brake-shoes have a segmental shape and at their lower ends are wedge shaped so that the point of the wedge can enter between the treads of the wheels and the rails. The shoes are preferably made of malleable iron and into the parts which engage the rail tread are inserted tempered steel plates 46 which are held in place by bolts and washers as indicated at 47.

The brake-shoes are off the wheel and rail treads when the fender is in elevated position, but when the fender is dropped, the brake-shoes are also applied. The brake-shoes take hold of the wheel tread and also the rail tread as shown in Figs. 6 and 7. The wedge shape of the lower ends of the shoes tends to raise the wheels slightly from the rails which prevents sliding and consequent flattening of the wheels. When the brake-shoes are applied the rollers 45 engage with the wheel tread and prevent the wheels from climbing the shoes.

In addition to the brake mechanism herein described the car will be equipped with the ordinary brake mechanism, the auxiliary brakes being intended only for emergency application.

The draw-bar 48 of the car is supported on a hanger 49 depending from the bottom of the car-platform.

I claim:

1. A car-fender comprising a pivoted fender-frame, a rock-shaft operatively connected to the fender-frame, means for locking the rock-shaft, and a buffer carried by the car and operatively connected to the locking means to release the same.

2. A fender comprising a pivoted fender-frame, a rock-shaft carrying a loop connected to the fender-frame, means for locking the rock-shaft, and a buffer carried by the car and operatively connected to the locking means to release the same.

3. A fender comprising a pivoted fender-frame, a rock-shaft operatively connected to the fender-frame, a lever on the rock-shaft, a latch engageable with the lever, and a buffer operatively connected to the latch for withdrawing the same from the lever.

4. A fender comprising a pivoted fender-frame, a rock-shaft operatively connected to the fender-frame, a lever on the rock-shaft, a latch engageable with the lever, and means for withdrawing the latch.

5. A fender comprising a pivoted fender-frame including a pair of beams and a cross-bar connecting the same, a rock-shaft having a loop through which the cross-bar extends, means for locking the rock-shaft, and means for releasing the same.

6. A combined brake and fender comprising a pivoted fender-frame including a pair of beams and a cross-bar connecting the same, and brake-shoes hung on the cross-bar.

7. A combined brake and fender comprising a pivoted fender-frame including a pair of beams and a cross-bar connecting the same, brake-shoes hung on the cross-bar, and springs carried by the aforesaid beams and bearing on the brake-shoes to normally hold them out of contact with the wheels.

8. A combined brake and fender comprising a pair of beams pivotally mounted on the car, brake-shoes pivoted at the rear ends of the beams, a fender carried at the front ends of the beams, and means for normally holding the beams elevated.

In testimony whereof I affix my signature, in presence of two witnesses.

HERMAN WILLIAM TEN BROCKE.

Witnesses:
    FRANK H. BRESLER,
    CHAS. BUCHTA.